(No Model.) 2 Sheets—Sheet 1.
J. A. MARIKLE.
BICYCLE.
No. 583,149. Patented May 25, 1897.
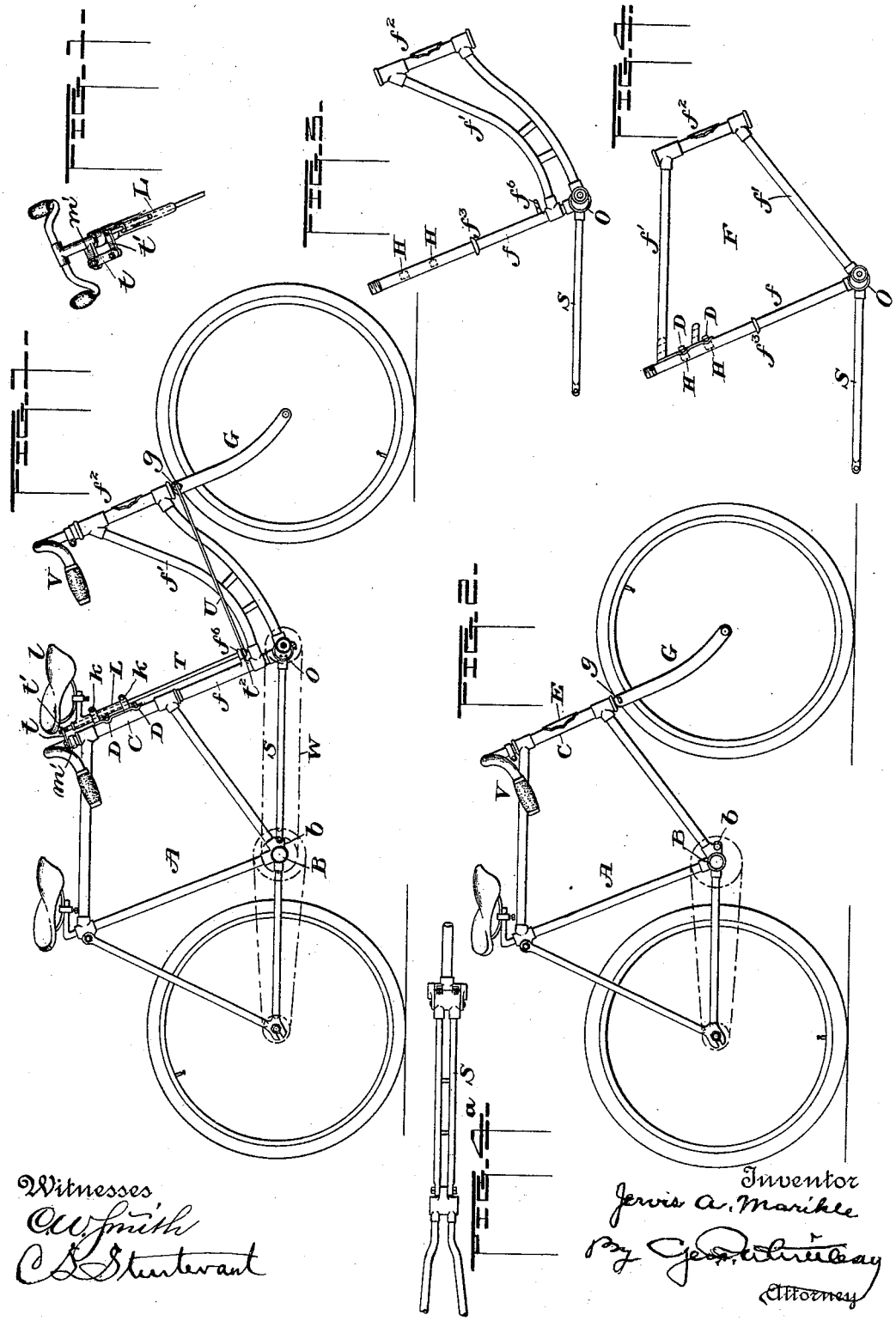
Witnesses
O. W. Smith
C. L. Sturtevant
Inventor
Jervis A. Marikle
By Geo. W. Lindsay
Attorney

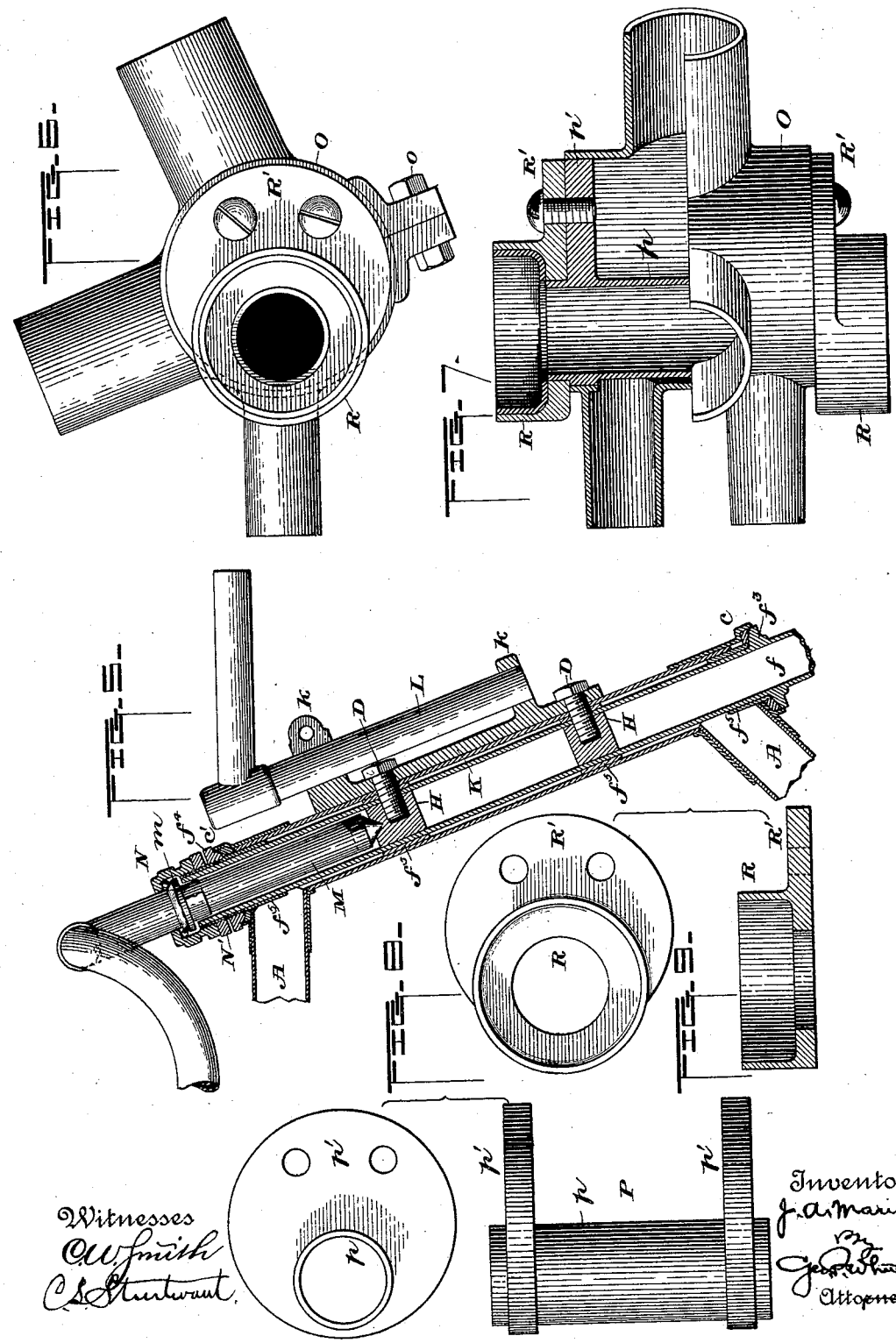

UNITED STATES PATENT OFFICE.

JERVIS ADELBERT MARIKLE, OF BROOKLYN, NEW YORK.

BICYCLE.

SPECIFICATION forming part of Letters Patent No. 583,149, dated May 25, 1897.

Application filed February 25, 1896. Serial No. 580,737. (No model.)

*To all whom it may concern:*

Be it known that I, JERVIS ADELBERT MARIKLE, a citizen of the United States, residing at Brooklyn, in the county of Kings and State of New York, have invented certain new and useful Improvements in Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.
My invention relates to bicycles; and its object is to enable an ordinary single bicycle of the well-known "safety" type to be converted readily into a tandem bicycle.

The invention consists in an auxiliary or supplementary frame adapted to be attached to the frame of a single bicycle, and thereby afford room for an additional seat, crank-shaft, driving-sprocket, and chain.

In the accompanying drawings, Figure 1 is a side elevation of a bicycle provided with my supplementary frame so as to constitute a tandem. Fig. 1ª is a perspective view of the steering mechanism. Fig. 2 shows the machine with the supplementary frame removed, the bicycle being the ordinary single safety. Fig. 3 is a view of the supplementary frame used in Fig. 1 suitable for a lady. Fig. 4 shows a supplementary frame for men. Fig. 4ª is a plan view of the lower braces of the supplementary frame. Fig. 5 is an axial section of the steering-head when the supplementary frame is attached. Fig. 6 is a side elevation, and Fig. 7 a half-section, of the eccentric bearing for the front crank-shaft.
Figs. 8 and 9 are details of the same.

The frame A of the single machine is made in the usual way and of the desired style. It differs from the ordinary machine in only one or two particulars, to wit, the coupling-lug $b$ on the front of the crank-hanger B and the holes in the front of the steering-head C to receive the screws D, hereinafter described. These holes are covered by the name-plate E when the machine is used single.
The supplementary frame F has an upright tubular pillar $f$, tubular reaches $f'$, and a steering-head $f^2$, the latter being of the same dimensions as the steering-head C. The upper end of the pillar $f$ is of the proper size to fit into the steering-head C after the front fork G and its attached steering-post have been removed. The pillar $f$ has a collar $f^3$ to set up against the lower head-bearing $c$, which is provided with a steel bushing, as shown. The upper end of the pillar extends above the upper head-bearing $c'$ and is threaded to receive a collar-nut $f^4$, which bears on the upper end of the steering-head. The pillar is preferably of somewhat less diameter than the steering-head and has secured upon it at intervals the collars or sleeves $f^5$, which fill the space between the pillar and the interior of the head and give a firm support to the pillar.

Inside the tubular pillar are secured one or more, preferably two, blocks H, preferably of steel, each containing a tapped hole drilled in from the front of the pillar. These holes register with the holes in the steering-head when the pillar is in place and serve to receive the screws D, which fasten to the front of the steering-head, the bracket K having upper and lower lugs $k$, containing bearings for the forward seat-post L. The upper block H also contains a step-bearing for the auxiliary or rear steering-post M, which is received in the upper part of the tubular pillar $f$, and has a collar $m$, forming with the bearing-cup N, screwed upon the upper end of the pillar, a ball-bearing for the steering-post M. The cup N may be locked by a jam-nut N'.

The lower end of the pillar $f$ is brazed to the front crank-hanger, which is a horizontal cylindrical shell O, forming a housing for the eccentric shaft-bearing P. This consists of a sleeve $p$, forming the shaft-bearing proper and mounted eccentrically in or integral with two disks $p'$, one at each end of the sleeve.

The disks fit snugly into the ends of the shell O and turn easily therein. The shell is split on its under side and is provided with ears and a cramping-bolt $o$, so that it can be tightened upon the disks to retain them in position after they have been turned to adjust the position of the sleeve $p$. Surrounding each end of the sleeve is a cup R, formed upon a disk R', which is fastened to the disk $p'$. The cups form part of the ball-casings for the crank-shaft and can be readily removed when worn.

Attached to the rear of the crank-hanger O are one or more braces S, the rear ends of which are bolted to the lug $b$, thus making the composite tandem frame very rigid and strong.

When the lady's supplementary frame is used, I prefer to arrange the steering apparatus as shown in Fig. 1. On the rear handle-post M is an arm $m'$, which is connected by a short link $t$ with an arm $t'$ on the upright rock-shaft T, journaled in the tubular seat-post L and in a bracket $f^6$ near the lower end of the pillar $f$. A rock-arm $t^2$ at the lower end of this shaft is connected by a link U with an arm $g$ on the front fork G.

When the man's supplementary frame, Fig. 4, is used, the bracket K' is slightly modified to receive it, as shown, and in place of the steering apparatus shown in Fig. 1 there may be used a simple link connecting the two handle-bars.

When it is desired to change the single machine shown in Fig. 2 to the tandem shown in Fig. 1, the operation is as follows: The handle V is detached, and the front fork G and its steering-post are removed from the steering-head C. The supplementary frame is then put in place by inserting the pillar $f$ into the steering-head C and screwing down the collar-nut $c'$. The braces S are bolted to the coupling-lug $b$. The front fork and steering-post are inserted into the steering-head $f^2$ and the handle V attached. The handle-post M is then inserted into the upper end of the pillar $f$, and the bearing-cup N is screwed down and locked. The name-plate E is removed from the steering-head, and the bracket K is fastened in place by the screws D. The seat-post L, carrying the seat $l$, is then secured to the bracket, and the steering apparatus is put into place and connected. The chain W, connecting the two crank-shafts, is then passed around the sprockets, and the front eccentric bearing is adjusted to give the chain the proper tension. The tandem is then ready for use.

I am aware that tandem bicycles, both convertible and non-convertible, have been made before, and I therefore do not claim such machines, broadly.

Having thus described my invention, what I claim is—

1. In a bicycle, a supplementary frame composed of the pillar $f$, the reaches $f'$, the steering-head $f^2$, the collar $f^3$ on the pillar, the blocks H inside the pillar, one of which has a bearing for a steering-post, a seat-post bracket adapted to be fastened to the blocks H, and one or more braces S attached to the lower end of the pillar $f$, substantially as described.

2. In a bicycle, a supplementary frame comprising a tubular pillar adapted to be inserted into the steering-head of a single machine, one or more blocks fastened inside said pillar, a collar on the pillar below the blocks, a collar-nut on the pillar above said blocks, a steering-post received in said pillar and stepped in the upper block, and provided with a collar, and a bearing-cup screwed upon the pillar above said collar, a front fork in the steering-head of said supplementary frame, and connections between said fork and the steering-post, substantially as described.

3. The combination with a single bicycle having one or more holes in its steering-head, of a supplementary frame comprising a pillar adapted to be inserted into said steering-head, one or more blocks in said pillar containing tapped holes to register with those in the steering-head, a seat-post bracket, and screws passing through said bracket into said block, substantially as described.

4. In a tandem bicycle, the combination with the rear steering-head, of a rock-shaft journaled adjacent thereto having upper and lower rock-arms, a rear handle-post having an arm connected with the upper rock-arm, and a front handle-post having an arm connected with the lower rock-arm, substantially as described.

5. In a tandem bicycle, the combination with the rear steering-head, of a tubular seat-post attached thereto, a rock-shaft journaled in said seat-post, and rock-arms on said shaft connected respectively with the front and rear steering-posts, substantially as described.

6. The combination with a single bicycle, of a supplementary frame, comprising a pillar $f$ carrying a bracket $f^6$, a tubular seat-post attached to the rear steering-head, a rock-shaft journaled in said seat-post and said bracket, rock-arms on said shaft and links connecting said arms with the steering-posts, substantially as described.

In testimony whereof I affix my signature in presence of two witnesses.

JERVIS ADELBERT MARIKLE.

Witnesses:
ARTHUR C. FORBES,
FRANK B. NAIRNE.